US008248074B2

(12) United States Patent
Perryman et al.

(10) Patent No.: US 8,248,074 B2
(45) Date of Patent: Aug. 21, 2012

(54) DETECTION OF FAULTS IN AN INJECTOR ARRANGEMENT

(75) Inventors: Louisa J. Perryman, Rainham (GB); Daniel Jeremy Hopley, Chislehurst (GB)

(73) Assignee: Delphi Technologies Holding S.arl, Troy, MI (US)

( * ) Notice: Subject to any disclaimer, the term of this patent is extended or adjusted under 35 U.S.C. 154(b) by 985 days.

(21) Appl. No.: 12/287,724

(22) Filed: Oct. 10, 2008

(65) Prior Publication Data

US 2009/0121724 A1 May 14, 2009

(30) Foreign Application Priority Data

Oct. 11, 2007 (EP) .................................... 07254036

(51) Int. Cl.
*G01M 15/00* (2006.01)

(52) U.S. Cl. ....................................... 324/379; 324/378

(58) Field of Classification Search .................. 324/378, 324/379, 500, 522

See application file for complete search history.

(56) References Cited

U.S. PATENT DOCUMENTS

| | | | | |
|---|---|---|---|---|
| 5,130,598 | A | 7/1992 | Verheyen et al. | |
| 5,387,870 | A * | 2/1995 | Knapp et al. | 324/379 |
| 6,487,505 | B1 | 11/2002 | Mock et al. | |
| 6,820,474 | B2 | 11/2004 | Rueger et al. | |
| 2001/0039484 | A1 | 11/2001 | Freudenberg et al. | |
| 2004/0008032 | A1 | 1/2004 | Rueger et al. | |
| 2005/0199221 | A1 | 9/2005 | Dieti et al. | |
| 2006/0231311 | A1 | 10/2006 | Fujii et al. | |

FOREIGN PATENT DOCUMENTS

| | | |
|---|---|---|
| DE | 10 2006 001 377 | 7/2007 |
| EP | 1 505 288 | 2/2005 |
| EP | 1 561 937 | 8/2005 |
| EP | 1 843 027 | 10/2007 |
| GB | 2 364 796 | 2/2002 |
| JP | 1-202177 | 8/1989 |
| JP | 4-507481 | 12/1992 |
| JP | 2002-21612 | 1/2002 |
| JP | 2002-81341 | 3/2002 |
| JP | 2006-316779 | 11/2006 |
| WO | 01/75289 | 10/2001 |

OTHER PUBLICATIONS

European Search Report dated Jun. 6, 2008.
Japan Office Action dated Jun. 11, 2010.

* cited by examiner

*Primary Examiner* — Vincent Q Nguyen
(74) *Attorney, Agent, or Firm* — Mark H. Svoboda

(57) ABSTRACT

A fault detection method is provided for detecting faults in an injector arrangement. The injector arrangement includes one or more piezoelectric fuel injectors connected in an injector drive circuit, and the injector drive circuit is arranged to control operation of the one or more piezoelectric fuel injectors. The fault detection method includes determining a sample voltage at a sample point in the injector drive circuit at a first sample time. The sample voltage is the voltage on an injector or is related to the voltage on an injector. The method further includes calculating a range of predicted voltages expected at the sample point at a second sample time following the first sample time, and determining the sample voltage at the sample point at the second sample time. The presence of a fault is detected if the sample voltage determined at the sample point at the second sample time is not within the range of predicted voltages.

19 Claims, 6 Drawing Sheets

DETECTION OF FAULTS IN AN INJECTOR ARRANGEMENT

TECHNICAL FIELD

The present invention relates to a method for detecting faults in a fuel injector arrangement, and particularly to a method for detecting short circuit and open circuit faults in piezoelectric fuel injectors.

BACKGROUND TO THE INVENTION

In a direct injection internal combustion engine, a fuel injector is provided to deliver a charge of fuel to a combustion chamber prior to ignition. Typically, the fuel injector is mounted in a cylinder head with respect to the combustion chamber such that its tip protrudes slightly into the chamber in order to deliver a charge of fuel into the chamber.

One type of fuel injector that is particularly suited for use in a direct injection engine is a so-called piezoelectric injector. A piezoelectric injector 12 and its associated control system 14 are shown schematically in FIG. 1.

The piezoelectric injector 12 includes a piezoelectric actuator 16 that is operable to control the position of an injector valve needle 17 relative to a valve needle seat 18. The piezoelectric actuator 16 includes a stack 19 of piezoelectric elements, having the electrical characteristics of a capacitor. The stack 19 of piezoelectric elements expands and contracts in dependence on a differential voltage applied across the terminals of the actuator to charge or discharge the actuator. The expansion and contraction of the piezoelectric elements is used to vary the axial position, or 'lift', of the valve needle 17 relative to the valve needle seat 18.

By application of an appropriate voltage differential across the actuator 16, an injection event is initiated, whereby the valve needle 17 is caused to disengage the valve seat 18, causing fuel to be delivered into an associated combustion chamber (not shown) through a set of nozzle outlets 20. Similarly, by application of an appropriate voltage differential across the actuator 16, the valve needle is caused to engage the valve seat 18, to prevent fuel delivery through the outlets 20 and terminate the injection event.

The piezoelectric injector 12 is controlled by an injector control unit 22 (ICU) that forms an integral part of an engine control unit 24 (ECU). The ICU 22 typically comprises a microprocessor 26 and memory 28. The ECU 24 also comprises an injector drive circuit 30, to which the piezoelectric injector 12 is connected by way of first and second power supply leads 31, 32.

Piezoelectric injectors are typically grouped together in banks. As described in EP1400676, each bank of piezoelectric injectors has its own drive circuit for controlling operation of the piezoelectric injectors. The use of these drive circuits enables the voltage applied across the piezoelectric fuel injectors, to be controlled dynamically. This may be achieved by using two storage capacitors that are alternately connected to the injector bank.

One of the storage capacitors is connected to the injector bank during a charge phase when a charge current flows through the injector bank to charge an injector, thereby initiating an injection event in a 'charge-to-inject' fuel injector, or terminating an injection event in a 'discharge-to-inject' fuel injector. The other storage capacitor is connected to the injector bank during a discharge phase, to discharge the injectors, thereby terminating the injection event in a charge-to-inject fuel injector, or initiating an injection event in a discharge-to-inject fuel injector. The expressions "charging the injectors" and "discharging the injectors" are used for convenience and refer to the processes of charging and discharging, respectively, the piezoelectric actuators of the fuel injectors.

Like any circuit, faults may occur in a drive circuit. In safety critical systems, such as diesel engine fuel injection systems, a fault in the drive circuit may lead to a failure of the injection system, which could consequentially result in a catastrophic failure of the engine. Such faults include short circuit faults and open circuit faults in the piezoelectric actuators of the fuel injectors. A typical short circuit fault that may occur is a short circuit between the terminals of the piezoelectric actuator; otherwise referred to as a 'stack terminal' short circuit.

Diagnostic techniques for detecting short circuit, and open circuit faults in the piezoelectric actuators are disclosed in applicant's co-pending patent applications EP 06251881.6, EP 06253619.8, EP 06256140.2, and EP 07252534.8, the contents of each document being incorporated herein by reference. However, there is a need to develop further diagnostic techniques in order to detect faults that might otherwise not be detected by these techniques.

SUMMARY OF THE INVENTION

According to a first aspect of the present invention, there is provided a fault detection method for detecting faults in an injector arrangement comprising one or more piezoelectric fuel injectors connected in an injector drive circuit arranged to control operation of the one or more piezoelectric fuel injectors, the fault detection method comprising:

(a) determining a sample voltage at a sample point in the injector drive circuit at a first sample time, the sample voltage at the sample point being related to the voltage on an injector;

(b) using the sample voltage at the first sample time to calculate a range of predicted voltages expected at the sample point at a second sample time following the first sample time;

(c) determining the sample voltage at the sample point at the second sample time; and (d) determining the presence of a fault if the sample voltage determined at the sample point at the second sample time is not within the range of predicted voltages.

The present invention provides a method of determining faults on an injector by predicting the voltage on the injector based upon the expected charging and/or discharging characteristics of the injector over a period of time. The actual voltage on the injector is then measured and compared to the predicted voltage, and a fault is determined if there is a discrepancy between the actual and predicted voltage values.

The injectors may be discharge to inject injectors.

The sample voltage may be the voltage on the injector. Alternatively, the sample voltage may be directly proportional to the voltage on the injector. Hence, the step of determining the sample voltage may include sampling the voltage on the injector, or sampling a voltage related to the voltage on the injector.

The sample point in the injector drive circuit may be a bias point.

The step of determining a range of predicted voltages may include determining a minimum predicted voltage, and the method may further comprise determining the presence of a fault in the event that the sample voltage determined at the sample point at the second sample time is lower than the minimum predicted voltage.

The method may further comprise determining the range of predicted voltages based upon the capacitance of the piezoelectric fuel injector. The capacitance of the piezoelectric fuel injector refers to the capacitance of the piezoelectric stack of the injector actuator. The method may also comprise determining the range of predicted voltages based upon a function defining acceptable voltage decay against time.

The method may include performing a drive pulse on the injector between the first and second sample times. The drive pulse may be a charge pulse or a discharge pulse. The method may comprise determining the range of predicted voltages based upon the current and duration of the drive pulse.

The method may comprise sensing a current in the injector drive circuit during the drive pulse. A signal indicative of current flow through the injector may be monitored. If a fault is determined at step (d) above, then the presence or substantial absence of a current in the drive circuit when the drive pulse is performed may be used to determine if the fault is a short circuit or an open circuit fault. The presence of a short circuit fault may be determined if a current is sensed when the drive pulse is performed. However, the presence of an open circuit fault may be determined if substantially no current is sensed when the drive pulse is performed.

A fault variable may be incremented each time a fault is determined. The fault variable may also be decremented each time an injector is found to be non-faulty. The piezoelectric fuel injector may be disabled in the event that the fault variable reaches a predetermined value.

The fault detection method may be performed during a voltage control regime. A voltage control regime is used to maintain or achieve a target voltage on the injector. A voltage control regime comprises measuring the voltage on the injector at successive sample intervals, comparing the voltage on the injector to the target voltage, and charging or discharging the injector accordingly until the target voltage is achieved. When the fault detection method is incorporated into a voltage control regime, in addition to performing successive voltage samples to monitor the voltage on the injector and charging or discharging the injectors accordingly to achieve or maintain the target voltage, the system is further arranged to predict what the voltage on an injector will be at the next sample, and diagnose a fault in an injector if the voltage measured on the injector does not agree with the predicted voltage.

Accordingly, the invention may provide a method for detecting faults in an injector arrangement comprising one or more piezoelectric fuel injectors connected in an injector drive circuit arranged to control operation of the one or more piezoelectric fuel injectors, the method comprising:

(a) determining a target voltage on an injector;

(b) determining the actual voltage on an injector at a first sample time;

(c) comparing the actual voltage on the injector to the target voltage;

(d) charging or discharging the injector if the actual voltage on the injector at the first sample time is not substantially equal to the target voltage;

(e) determining an expected value of the voltage on the injector at a second sample time;

(f) determining the actual voltage on the injector at the second sample time;

(g) determining the presence of a fault if the actual voltage on the injector at the second sample time is not substantially as expected.

In other embodiments of the invention, the actual voltage on the injector may not be determined as such. For example, a voltage related to the actual voltage on the injector could be used instead. This voltage may be proportional to the actual voltage on the injector.

A first voltage control regime is scheduled during periods of engine running when no injection events are performed, i.e. when the fuel demand drops to zero, for example during foot-off conditions. Charged actuators naturally lose some charge over time, and so it may be necessary to top-up the charge on the actuators to maintain a suitably high target voltage so that the injectors are ready to discharge-to-inject when a fuel demand occurs.

A second voltage control regime is performed at engine start-up, when the actuators are initially charged from a low voltage to a suitably high target voltage in preparation for being discharged to perform injection events. A third voltage control regime is performed when the engine is turned off, to actively discharge the actuators form a high voltage to a suitably low target voltage to prevent damage to the piezoelectric stacks.

Advantageously, when the invention is performed during a voltage control regime, the voltage samples performed under to the voltage control regime are also used in the fault detection method. As such, the present invention can be incorporated into a voltage control regime with very little time cost because no additional analogue-to-digital converter (ADC) reads are required over and above those required in the voltage control regime. Furthermore, as the voltage samples are used both in the voltage control regime and in the diagnostic scheme, this minimises the required processor and sampling resources. This serves to reduce costs which would otherwise be required to upgrade the microprocessor or provide additional ADC capabilities that would be required for other diagnostic schemes.

The present invention is particularly advantageous when used to detect faults at engine start-up, whilst the injectors are being charged to a high voltage under a voltage control regime. Previously, only low voltage diagnostics have been performed at engine start-up to avoid damaging the piezoelectric stacks of the injectors which may occur if the injectors are charged to a high voltage when the fuel pressure is too low in a common rail to which the fuel injectors are mounted. The diagnostics of the present invention are performed at engine start-up once a sufficiently high fuel pressure has been achieved in the common rail. This means that faults can be detected whilst the injectors are charging to a high voltage at engine start-up. Performing the diagnostics when there is a high voltage on the injectors increases the resolution of fault detection at start-up, which enables short circuits of relatively high resistance to be detected, which might not otherwise be detected by the low-voltage diagnostics at engine start-up.

According to a second aspect of the present invention, there is provided an apparatus for detecting faults in an injector arrangement comprising one or more piezoelectric fuel injectors connected in an injector drive circuit arranged to control operation of the one or more piezoelectric fuel injectors, the apparatus comprising a processor arranged to:

(a) determine a sample voltage at a sample point in the injector drive circuit at a first sample time, the sample voltage at the sample point being related to the voltage on an injector;

(b) use the sample voltage at the first sample time to calculate a range of predicted voltages expected at the sample point at a second sample time following the first sample time;

(c) determine the sample voltage at the sample point at the second sample time; and (d) determine the presence of a fault if the sample voltage determined at the sample point at the second sample time is not within the range of predicted voltages.

It will be appreciated that optional features of the method aspects of the invention apply equally to the apparatus aspect of the invention.

BRIEF DESCRIPTION OF THE DRAWINGS

In order that it may be more readily understood, the present invention will now be described with reference also to the following figures, in which.

DETAILED DESCRIPTION

Figure 1:
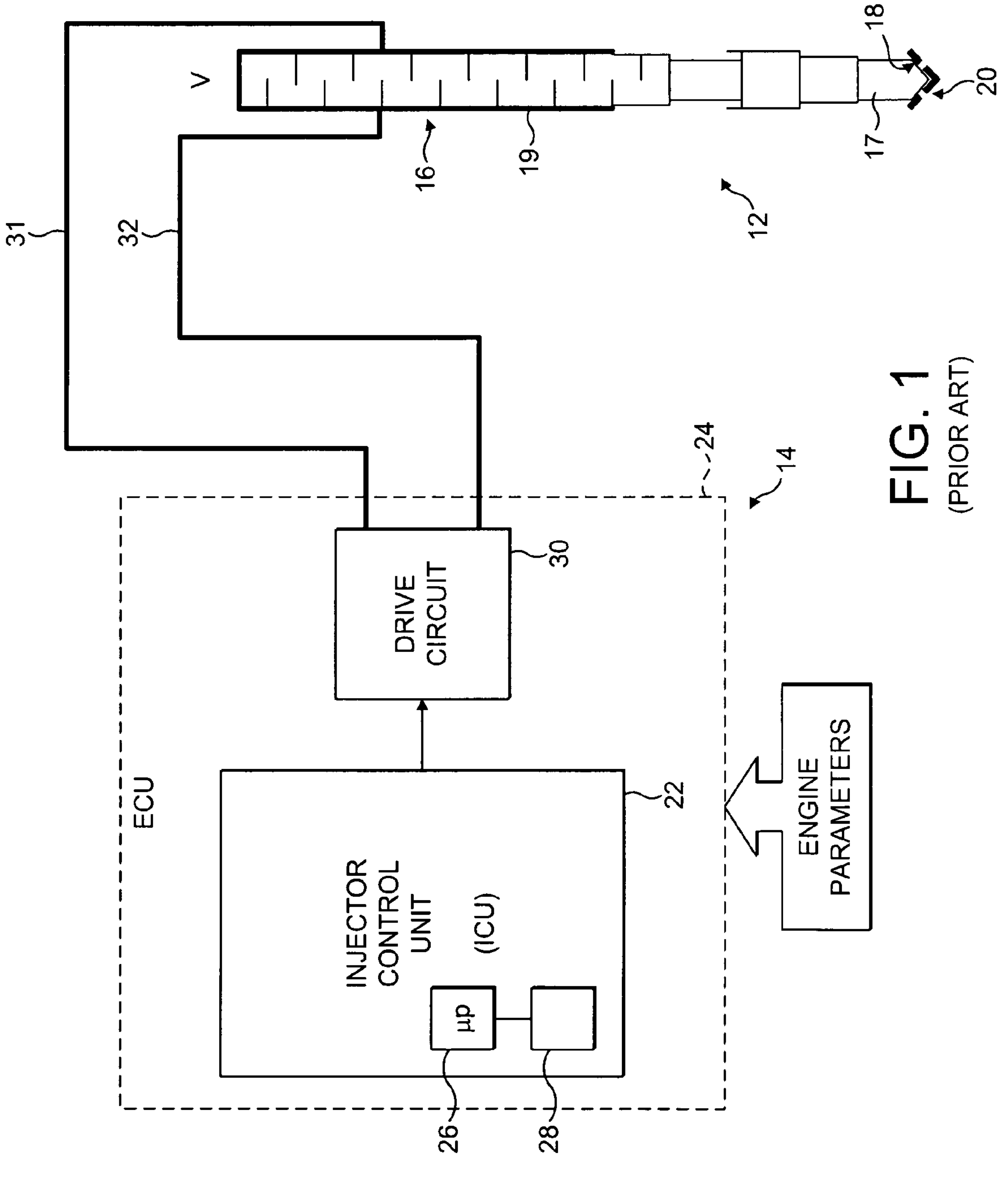
FIG. 1 (PRIOR ART)
FIG. 1 shows a schematic of a piezoelectric injector and its associated control system.
Figure 2:
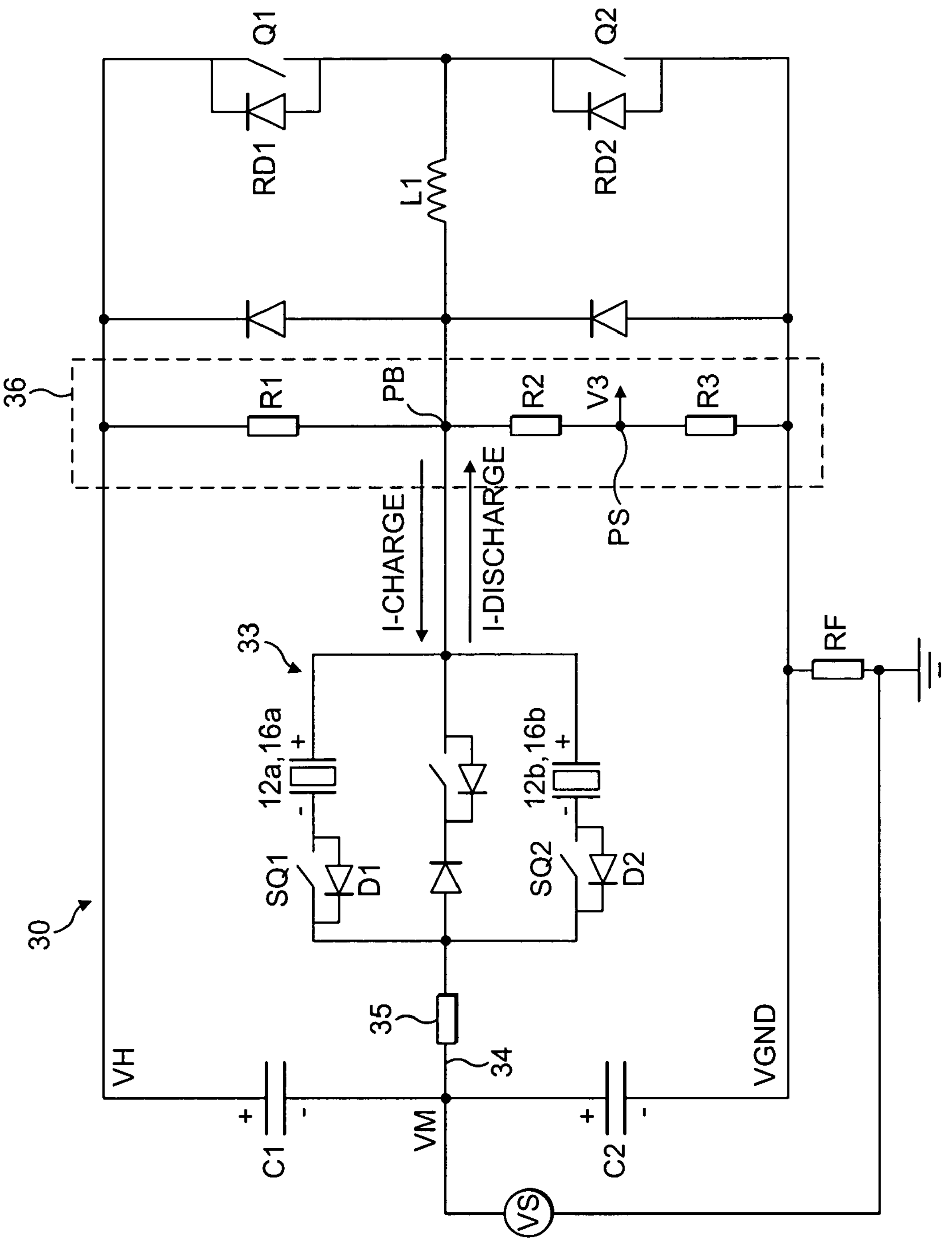
FIG. 2 is a circuit diagram of an injector drive circuit connected to a pair of injectors, showing a bias point PB at which voltage is monitored.

Reference has already been made to FIG. 1, which shows a typical piezoelectric fuel injector 12 connected to an injector drive circuit 30 of an ECU 24. Referring now to FIG. 2, this is a circuit diagram of an injector drive circuit 30 similar to the drive circuit in FIG. 1. In FIG. 2, the injector drive circuit 30 is connected to an injector bank 33 comprising a pair of discharge-to-inject piezoelectric injectors 12*a*, 12*b*.

The drive circuit 30 includes high, mid and ground voltage rails VH, VM and VGND respectively. The drive circuit 30 is generally configured as a half H-bridge with the mid voltage rail VM serving as a bi-directional middle current path 34. The piezoelectric injectors 12*a*, 12*b* comprise piezoelectric actuators 16*a*, 16*b* (hereinafter referred to simply as 'actuators'), which are connected in parallel in the middle circuit branch 34 of the injector drive circuit 30. The actuators 16*a*, 16*b* are located between, and coupled in series with, an inductor L1 and a current sensing and control means 35. Each actuator 16*a*, 16*b* is connected in series with a respective injector select switch SQ1, SQ2, and each injector select switch SQ1, SQ2 has a respective diode D1, D2 connected across it.

A voltage source VS is connected between the mid voltage rail VM and the ground rail VGND of the drive circuit 30. The voltage source VS may be provided by the vehicle battery (not shown) in conjunction with a step-up transformer (not shown), or other suitable power supply, for increasing the voltage from the battery to the required voltage of the mid voltage rail VM.

A first energy storage capacitor C1 is connected between the high and mid voltage rails VH, VM, and a second energy storage capacitor C2 is connected between the mid and ground voltage rails VM, VGND. A charge switch Q1 is located between the high and mid voltage rails VH, VM, and a discharge switch Q2 is located between the mid voltage and ground rails VM, VGND. As explained in more detail below, the charge and discharge switches Q1, Q2 are operable to connect the respective capacitors C1, C2 to the injectors (12*a*, 12*b*) to control the voltage on the injectors 12*a*, 12*b*. The expression 'voltage on an injector' is used for convenience, and refers to the voltage on the piezoelectric stack 19 (FIG. 1) of the actuator 16*a*, 16*b* of the injector 12*a*, 12*b*.

To increase the voltage on the injectors 12*a*, 12*b*, the injectors 12*a*, 12*b* are charged by closing the charge switch Q1 with the discharge switch Q2 remaining open. The first capacitor C1, when fully charged, has a potential difference of about 200 Volts across it, and so closing the charge switch Q1 causes current to flow from the positive/high terminal of the first capacitor C1, through the charge switch Q1 and the inductor L1 (in the direction of the arrow 'I-CHARGE'), through the injectors 12*a*, 12*b* and associated diodes D1 and D2 respectively, through the current sensing and control means 35, and back to the negative/low terminal of the first capacitor C1.

To decrease the voltage on an injector 12*a*, 12*b*, an injector 12*a* or 12*b* is selected by closing the associated injector select switch SQ1 or SQ2, and the selected injector 12*a* or 12*b* is discharged by closing the discharge switch Q2, with the charge switch Q1 remaining open. For example, to discharge the first injector 12*a*, the first injector select switch SQ1 is closed and current flows from the positive terminal of the second capacitor C2, through the current sensing and control means 35, through the actuator 16*a* of the selected first injector 12*a*, through the inductor L1 (in the direction of the arrow 'I-DISCHARGE'), through the discharge switch Q2 and back to the negative side of the second capacitor C2. No current is able to flow through the actuator 16*b* of the deselected second injector 12*b* because of the diode D2 and because the associated injector select switch SQ2 remains open.

As aforesaid, the injectors 12*a*, 12*b* are of the discharge-to-inject variety. This means that the injectors 12*a*, 12*b* must be charged to a suitably high target voltage at engine start-up so that they are ready to discharge to initiate an injection event when a fuel demand occurs. Similarly, during engine-running, when no fuel demand is present, for example under foot-off conditions, the voltage on the injectors 12*a*, 12*b* must be maintained at a suitably high target level so that the injectors 12*a*, 12*b* are ready to discharge to inject as soon as a fuel-demand occurs. Further, once the engine is turned off, at 'key-off', the injectors 12*a*, 12*b* may be actively discharged to a suitably low target voltage, so that the injectors 12*a*, 12*b* are not held in a charged state for prolonged periods, which can damage the actuators 16*a*, 16*b*.

A resistive bias network 36 is connected across the high voltage rail VH and ground rail VGND and intersects the middle circuit branch 34 at a bias point PB. The resistive bias network 36 includes first, second and third resistors R1, R2, R3 connected together in series. The first resistor R1 is connected between the high voltage rail VH and the bias point PB, and the second and third resistors R2 and R3 are connected in series between the bias point PB and the ground rail VGND. The second resistor R2 is connected between the bias point PB and the third resistor R3; and the third resistor R3 is connected between the second resistor R2 and the ground rail VGND. The first, second and third resistors R1, R2, R3 each have a known resistance of a high order of magnitude, typically of the order of hundreds of kiloohms. For convenience, R1, R2 and R3 are used herein to refer to both the resistors and to the resistances of the resistors.

The injector drive circuit 30 operates according to a 'voltage control regime' at engine start-up, during engine running, and at key-off. The voltage control regime involves monitoring the voltage on a selected injector 12*a* or 12*b* and charging or discharging the injector 12*a*, 12*b* accordingly to maintain or achieve a required target voltage VT on the injectors 12*a*, 12*b*.

An example of a voltage control regime is described below with reference to the flow chart of FIG. 3 and to the drive circuit 30 in FIG. 2.

[Step A1] The voltage Vx on a selected injector 12*a* or 12*b* is determined and compared to a predetermined target voltage VT. To determine the voltage Vx on an injector 12*a*, 12*b*, an injector 12*a* or 12*b* is selected by closing the associated injector select switch SQ1 or SQ2, and the voltage V3 at a point PS between the second and third resistors R2, R3 in the resistive bias network 36 is sampled using an analogue to digital (ADC) module of the microprocessor 26. The voltage Vx on the selected injector 12*a* or 12*b* is given by the voltage VB at the bias point PB, which is calculated according to equation 1 below.

$$V_x = V_B = \frac{V_3(R_2 + R_3)}{R_3} \qquad 1$$

[Step A2] If the voltage $V_x$ on the selected injector 12*a* or 12*b* is not equal to the target voltage VT, then a 'drive pulse' is scheduled to charge or discharge the selected injector 12*a* or 12*b* accordingly. For example, if the voltage $V_x$ on the selected injector 12*a* or 12*b* is below the target voltage VT, then the ECU 24 schedules a charge pulse to be performed. Conversely, if the voltage $V_x$ on the selected injector 12*a* or 12*b* is above the target voltage VT, then the ECU 24 schedules a discharge pulse to be performed. The expressions 'charge pulse' and 'discharge pulse' refer to charging or discharging the injectors 12*a*, 12*b* as described above for a predetermined period of time, which is typically in the region of between ten and a few hundred microseconds.

[Step A3] A further ADC read is performed to determine the voltage $V_{x+1}$ on the selected injector 12*a* or 12*b* after a predetermined sample period TS following the first reading in Step A1. The voltage $V_{x+1}$ on the selected injector 12*a* or 12*b* is compared to the target voltage VT.

[Step A4] If the voltage $V_{x+1}$ on the selected injector 12*a* or 12*b* is still not equal to the target voltage VT, then steps A2 and A3 are repeated until the target voltage VT is achieved.

[Step A5] If the voltage $V_x$ or $V_{x+1}$ on the selected injector 12*a* or 12*b* is equal to the target voltage VT at Step A1 or Step A3, then a further ADC read is scheduled to determine the voltage on another injector 12*a* or 12*b* on the injector bank 33.

Figure 3:
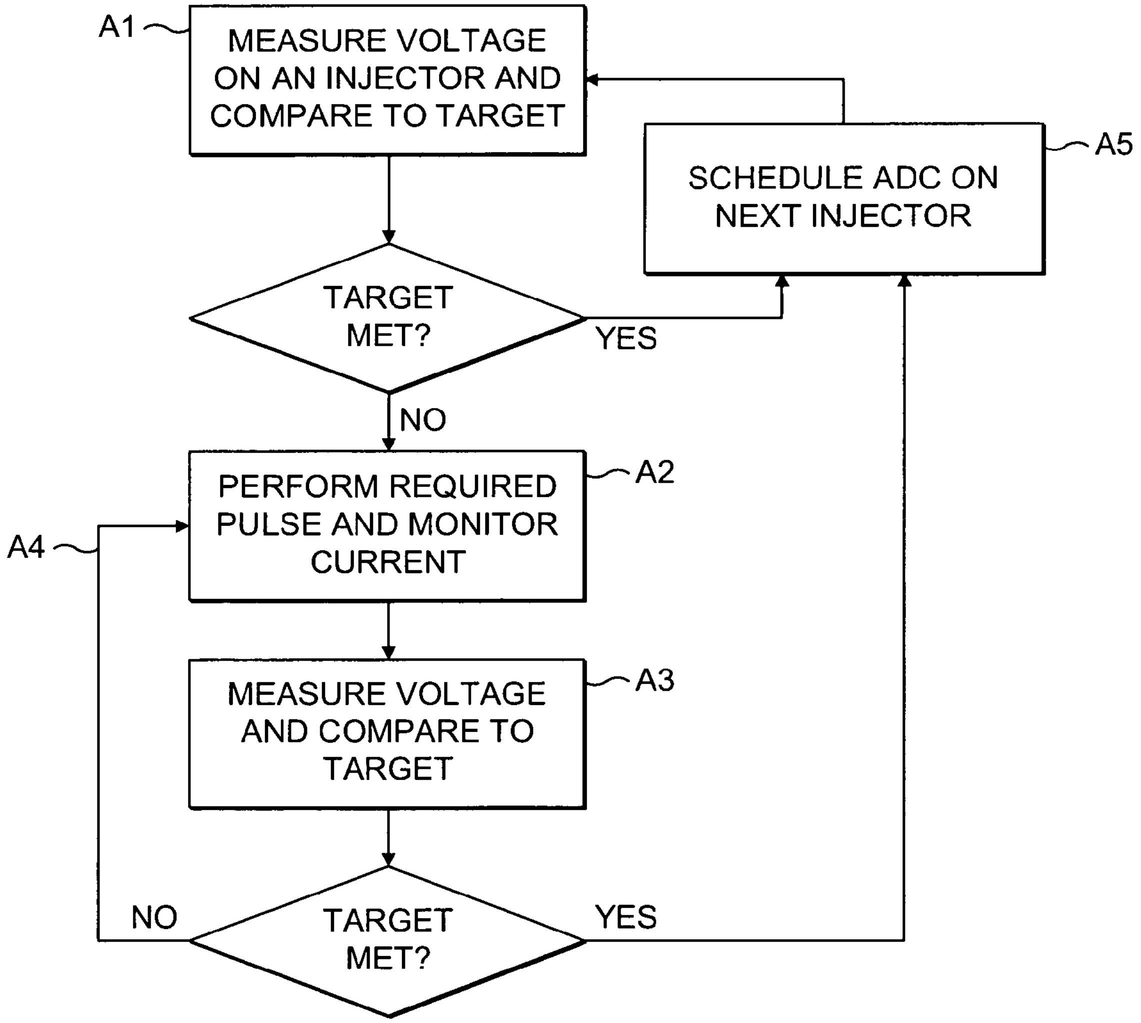
FIG. 3 is a flow chart of a voltage control regime, according to which the drive circuit of 2 is operated to control the voltage on the piezoelectric fuel injectors.

The time and current required for the charge or discharge pulse at step A2 in the voltage control regime of FIG. 3 are calculated in dependence upon the voltage difference between the voltage $V_x$ on the selected injector 12*a* or 12*b* and the target voltage VT. For example, if the voltage $V_x$ is close to the target voltage VT, a relatively short and/or low-current drive pulse may be required, whereas a relatively long and/or high-current drive pulse may be required if the voltage difference is large. The drive pulse current is controlled by the current sensing and control means 35.

In certain circumstances, a single charge or discharge pulse may be required to achieve the target voltage VT. In other circumstances, it may be desirable to charge or discharge the injectors 12*a*, 12*b* incrementally. For example, when discharging an injector 12*a*, 12*b* after the engine has been turned off, it is desirable to discharge in small steps in order to prevent an injection event from occurring in a discharge-to-inject injector. In these circumstances, the time and current required for the charge or discharge pulse will depend upon the required incremental voltage change on the injector 12*a*, 12*b*.

If an injector 12*a*, 12*b* has a short circuit, then the injector 12*a*, 12*b* will discharge between voltage samples to an extent governed by the resistance of the short circuit. If the resistance of the short circuit is sufficiently high, then the short circuit may not prevent the injector 12*a*, 12*b* from achieving the target voltage VT. However, if the short circuit is below a certain resistance, then it may prevent the injector 12*a*, 12*b* from reaching the target voltage VT. Moreover, if a selected injector 12*a* or 12*b* is open circuit, then no current will flow through the selected injector 12*a* or 12*b* when a charge or discharge pulse is performed at Step A2, and hence an open circuit injector will never achieve its target voltage VT.

A diagnostic scheme in accordance with an embodiment of the present invention is included in the voltage control regime to detect faults in the injectors 12*a*, 12*b* that have not previously been detectable during engine start-up, foot-off conditions or at key-off. The principles of the diagnostics are outlined below, and a voltage control regime including the diagnostic steps is described later with reference to FIG. 5.

The value of the voltage on the selected injector 12*a* or 12*b*, which is determined at Step A1 above, is recorded in the memory 28 of the microprocessor 26 of the ECU 24 (FIG. 1). The microprocessor 26 is arranged to calculate a range of predicted values for the voltage on the selected injector 12*a* or 12*b* at the next voltage sample (Step A3). If the voltage on the selected injector 12*a* or 12*b* determined at Step A3 is not within the range of predicted values, then this is indicative of a fault on the selected injector 12*a* or 12*b*. The principles used to predict the voltage on the selected injector 12*a* or 12*b* at the next sample are provided below.

If a charge pulse of current $I_{CH}$ and duration $T_{CH}$ is performed at Step A2, then the total charge delivered to the injectors 12*a*, 12*b* is given by equation 2:

$$Q_{CH} = I_{CH} \times T_{CH} \qquad 2$$

Maximum and minimum values of the likely capacitances (CMAX and CMIN) of the piezoelectric stacks 19 (FIG. 1) of the injector actuators 16*a*, 16*b* are stored in the memory 28 of the ECU 24. The maximum combined capacitance of the piezoelectric stacks 19 of the injectors 12*a*, 12*b* on the injector bank 33 is given by equation 3:

$$C_{BMAX} = n \times C_{MAX} \qquad 3$$

where n is the number of injectors 12*a*, 12*b* on the injector bank 33.

The capacitance of the piezoelectric stacks 19 of all the injectors 12*a*, 12*b* in the injector bank 33 must be considered when a charge pulse is performed, because all of the injectors 12*a*, 12*b* will charge using the diodes D1 and D2 connected in parallel with the injector select switches SQ1 and SQ2 in FIG. 2.

For an ideal injector 12*a*, 12*b*, the minimum voltage gain following a charge pulse at Step A2 is given by equation 4:

$$\Delta V_{min} = \frac{I_{CH} \times T_{CH}}{n \times C_{MAX}} \qquad 4$$

Hence, the minimum value of the voltage $V_{x+1(min)}$ on an ideal injector 12*a* or 12*b* at the next sample, e.g. at Step A3, is given by equation 5:

$$V_{x+1(min)} = V_x + \frac{I_{CH} \times T_{CH}}{n \times C_{MAX}} \qquad 5$$

where $V_x$ is the voltage calculated at the previous sample.

The maximum value of the voltage $V_{x+1}$ determined at Step A3 is limited to the voltage $V_H$ on the high voltage rail VH. If the voltage $V_{x+1}$ on the selected injector 12*a* or 12*b* is equal to or greater than the minimum voltage in equation 5 at the next sample following the charge pulse, then the selected injector 12*a* or 12*b* is functioning correctly and does not have a fault.

If the selected injector 12*a* or 12*b* has an open circuit fault, then it will not charge when the charge pulse is performed because no current will flow through the selected injector 12*a* or 12*b*. Alternatively, if the selected injector 12*a* or 12*b* has a short circuit, then the selected injector 12*a* or 12*b* will discharge through that short circuit between voltage samples. In either case, if the selected injector 12*a* or 12*b* has a fault, the voltage $V_{x+1}$ following the charge pulse will be lower than the minimum expected voltage according to equation 5.

As explained above, not all short circuits compromise the normal operation of the system. For example, short circuits of suitably high resistance do not prevent the injectors 12*a*, 12*b* from achieving the target voltages VT, and so may not be deemed as faults. A minimum resistance value of a short circuit that is deemed acceptable is therefore predetermined. The likely voltage decay of an injector 12*a*, 12*b* through a short circuit of the minimum acceptable resistance is mapped against time and stored in the memory 28 of the ECU 24 (FIG. 1). Any voltage decay that is greater than this is indicative of a short circuit of lower resistance than that deemed acceptable.

The voltage decay through a short circuit that is deemed acceptable is a function of the time between voltage samples, which in the example above is TS. Hence, allowing for short circuits of acceptable resistance, the minimum value of the voltage $V_{x+1(min)}$ on a selected injector 12*a* or 12*b* deemed to be non-faulty following a charge pulse at Step A2, is given by equation 6:

$$V_{x+1(min)} = V_x + \frac{I_{CH} \times T_{CH}}{n \times C_{MAX}} - f(T_S) \quad (6)$$

where $f(T_s)$ is a function defining acceptable voltage decay against time.

Hence, when the voltage on the selected injector 12*a* or 12*b* is next sampled, a voltage less than this minimum value is indicative of a fault on the injector bank 33.

If no drive pulse is required at Step A3 above, then equation 6 can be simplified since the current (ICH) is now zero, and hence the minimum voltage on a selected injector 12*a* or 12*b* that is deemed to be non-faulty at the next sample is given by equation 7:

$$V_{x+1(min)} = V_x - f(T_S) \quad (7)$$

Hence, if a short circuit occurs between samples when a drive pulse is not performed, it can be identified if the voltage sampled drops below this value.

If the drive pulse performed at Step A2 is a discharge pulse, an injector 12*a* or 12*b* must be selected by closing the associated injector select switch SQ1 or SQ2 because discharge pulses are performed on individual injectors as described previously. Therefore, only the capacitance of the piezoelectric stack on a single injector 12*a* or 12*b* needs to be considered when the drive pulse at Step A2 is a discharge pulse.

The minimum value of the voltage $V_{x+1(min)}$ on a selected injector 12*a* or 12*b* deemed to be non-faulty following a discharge pulse at Step A2, is given by equation 8:

$$V_{x+1(min)} = V_x - \frac{I_{DIS} \times T_{DIS}}{C_{MIN}} - f(T_S) \quad (8)$$

Hence, when the voltage on the selected injector 12*a* or 12*b* is next sampled, a voltage less than this minimum value is indicative of a fault on the injector bank 33.

The diagnostic scheme is able to differentiate between short circuit and open circuit faults. If an injector 12*a* or 12*b* is open circuit, then the voltage reading at Step A1 or A3 does not correspond to the voltage on the selected injector 12*a* or 12*b*, but instead corresponds to the bias voltage VB that would be measured at the bias point PB in FIG. 2 if no injector 12*a*, 12*b* were selected, i.e. if both injector select switches SQ1 and SQ2 were open. This is because selecting an injector 12*a*, 12*b* has no effect on an injector 12*a*, 12*b* that is open circuit. During a voltage control regime, the voltage VB at the bias point PB with no injector 12*a*, 12*b* selected, or with an injector 12*a*, 12*b* selected that is open-circuit, is affected by any drive pulses that have been performed previously on the injector bank 33 as described below with reference to FIG. 4.

Figure 4:
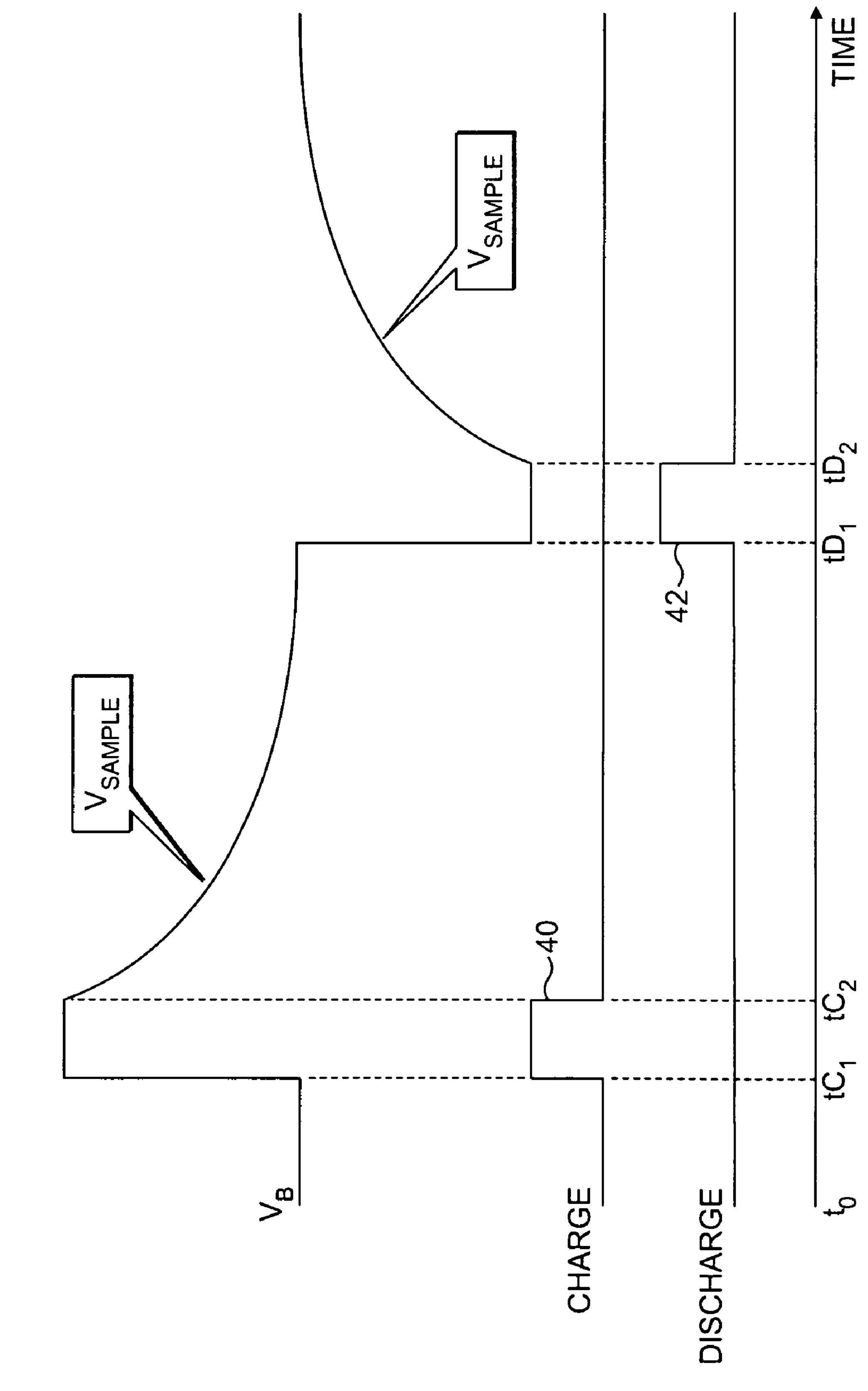
FIG. 4 is a plot showing the variation in voltage at the bias point PB in FIG. 2, following a charge and a discharge pulse.

FIG. 4 shows the variation of the bias voltage VB at the bias point PB in FIG. 2, during and subsequent to a charge and a discharge pulse 40, 42. Referring to FIG. 4, prior to the charge pulse 40 being performed, i.e. between time t0 and tC1, the bias voltage VB is at an equilibrium value given by equation 9 below:

$$V_B = \frac{V_H(R_2 + R_3)}{R_1 + R_2 + R_3} \quad (9)$$

where VH is the voltage on the high voltage rail VH.

During the charge pulse 40, i.e. between time tC1 and tC2, the bias voltage VB increases to the voltage on the high voltage rail VH. Following the charge pulse 40, and before the discharge pulse 42 is performed, i.e. between tC2 and tD1, the bias voltage decays back to its equilibrium value given by equation 1. This corresponds to current flowing through the resistors R2 and R3 in the resistive bias network 36 to ground [FIG. 2]. When the discharge pulse 42 is performed, i.e. between tD1 and tD2, the bias voltage VB decreases to zero Volts.

Following the discharge pulse 42, i.e. after tD2, the bias voltage VB returns to its equilibrium value given by equation 9, corresponding to a current flowing from the high voltage rail VH through the resistor R1 in the resistive bias network 36 [FIG. 2].

If voltage readings were delayed until after the decay period, then open circuit faults could be detected if the voltage determined at Step A1 or A3 in FIG. 3 was equal to the equilibrium value of the bias voltage VB according to equation 9 above. However, to delay taking a voltage reading until the after the decay period has elapsed makes the system too slow, and so voltage readings are preferably taken during the decay period at the positions indicated by the label 'Vsample' on FIG. 4. Typically, the time constant of the decay is about 4.5 milliseconds, and the voltage is sampled about 250 microseconds after the end of the charge or discharge pulse 40, 42. This voltage will be substantially the same over a number of samples and, whether charging or discharging, the target voltage VT will never be achieved if there is an open circuit injector 12*a*, 12*b*.

The diagnostic scheme is arranged to distinguish between an open circuit injector 12*a*, 12*b* and a short circuit injector 12*a*, 12*b* having a discharge pattern through its short circuit that gives, coincidentally, the same voltage readings as the variation in the bias voltage VB shown in FIG. 4. To achieve this, the current sensing and control means 35 is arranged to monitor current in the drive circuit 30 when the drive pulses 40, 42 are performed.

If the target voltage VT on the selected injector 12*a*, or 12*b* has not been achieved after a series of charge pulses 40 have been performed, and substantially no current is sensed through the current sensing and control means 35, this indicates that the selected injector 12*a* or 12*b* is open circuit. If a current is sensed through the current sensing and control means 35, but the target voltage VT is still not achieved, this indicates that the selected injector 12*a* or 12*b* has a short circuit. Similarly, if the target voltage VT on the selected injector 12*a* or 12*b* has not been achieved after a series of discharge pulses 42 have been performed, and substantially no current is sensed through the current sensing and control means 35, this indicates that the selected injector 12*a* or 12*b* is open circuit.

Figure 5:
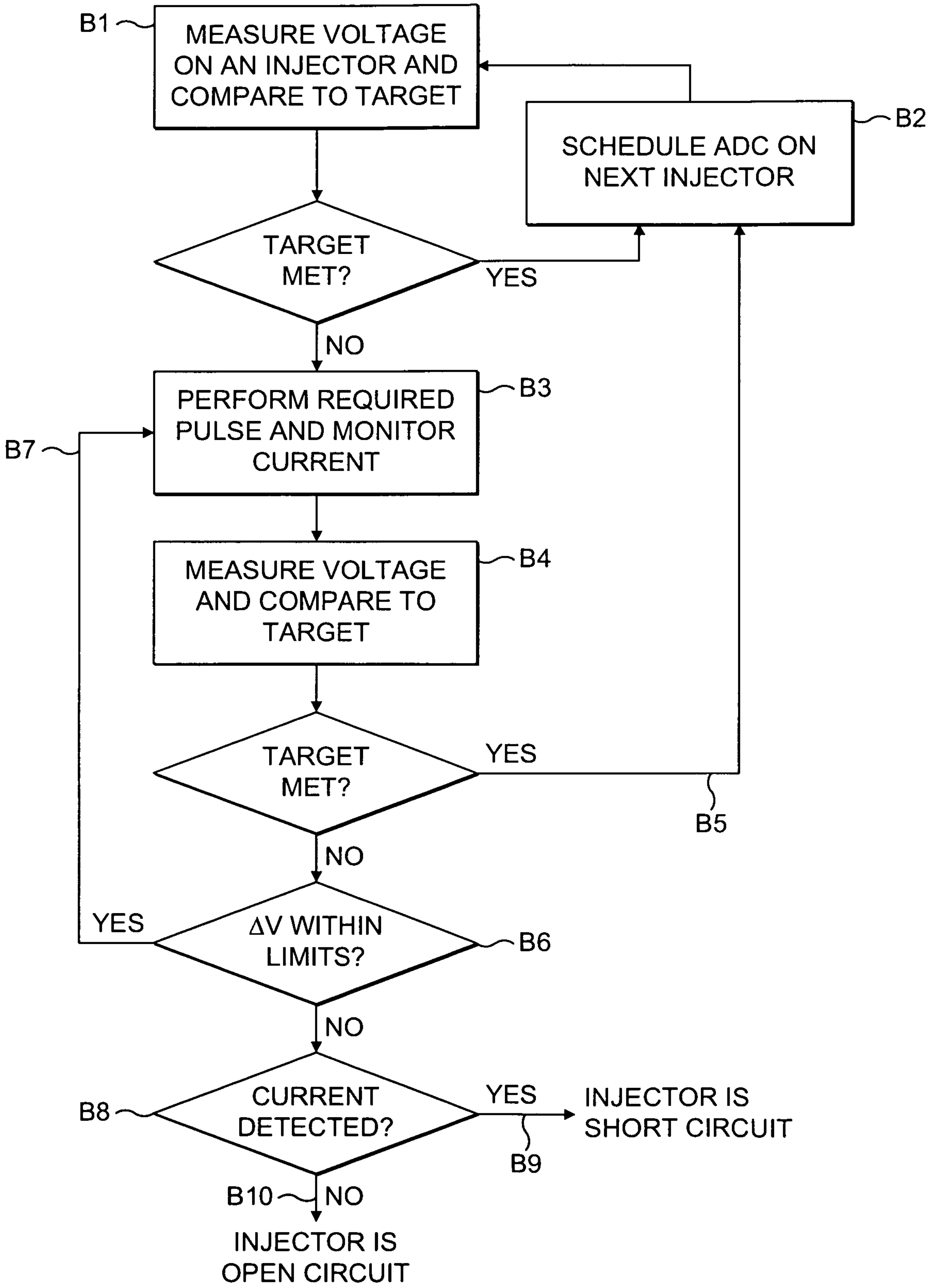
FIG. 5 is a flow chart of a fault detection scheme for detecting faults in the injectors of FIG. 2 during a voltage control regime.

FIG. 5 is a flow chart of a voltage control regime incorporating the diagnostic scheme described above. Referring to FIG. 5:

[Step B1] The voltage $V_x$ on a selected injector 12*a* or 12*b* is determined and compared to a predetermined target voltage VT.

[Step B2] If the voltage $V_x$ on the selected injector 12*a* or 12*b* is equal to the target voltage VT, then the selected injector 12*a* or 12*b* is deemed non-faulty, and a further ADC read is scheduled to determine the voltage $V_x$ on another injector 12*a* or 12*b* on the injector bank 33.

[Step B3] If the voltage $V_x$ on the selected injector 12*a* or 12*b* is not equal to the target voltage VT, then a drive pulse 40, 42 is scheduled to charge or discharge the selected injector 12*a* or 12*b* accordingly. The current sensing and control means 35 monitors the current flow through the injector bank 33 during the drive pulse 40, 42.

[Step B4] A further ADC read is performed to determine the voltage $V_{x+1}$ on the selected injector 12*a* or 12*b* after a predetermined sample period TS following the first reading in Step B1. The voltage $V_{x+1}$ on the selected injector 12*a* or 12*b* is compared to the target voltage VT.

[Step B5] If the voltage $V_{x+1}$ on the selected injector 12*a* or 12*b* is equal to the target voltage VT, then a further ADC read is scheduled to determine the voltage $V_x$ on another injector 12*a* or 12*b* on the injector bank 33.

[Step B6] If the voltage $V_{x+1}$ on the selected injector 12*a* or 12*b* is not equal to the target voltage VT, then the voltage $V_{x+1}$ on the selected injector 12*a* or 12*b* is compared to the minimum voltage limits in equations 6 or 8, depending on whether the drive pulse at Step B3 was a charge pulse 40 or a discharge pulse 42.

[Step B7] If the voltage $V_{x+1}$ on the selected injector 12*a* or 12*b* is greater than the minimum voltage limit in Step B6, then the selected injector 12*a* or 12*b* is deemed non-faulty. However, the target voltage VT has not yet been achieved and so Steps B3 to B6 are repeated until the target voltage VT is achieved.

[Step B8] If the voltage $V_{x+1}$ on the selected injector 12*a* or 12*b* is less than the minimum voltage limit $V_{x+1(min)}$ in Step B6, then there is a fault on the selected injector 12*a* or 12*b*, and the current monitored at Step B3 is used to determine if the fault is a short circuit fault or an open circuit fault.

[Step B9] If a current was detected at Step B3 during the drive pulse 40, 42, then the selected injector 12*a* or 12*b* has a short circuit fault.

[Step B10] If no current was detected at Step B3 during the drive pulse 40, 42, then the selected injector 12*a* or 12*b* is open circuit.

Each time a fault is detected in the diagnostic routine described above, the microprocessor 26 of the ECU 24 (FIG. 1) increments a fault variable stored in the 28 of the ECU 24. Conversely, each time an injector 12*a*, 12*b* is deemed non-faulty, the microprocessor 26 decrements the fault variable. A short circuit variable and an open circuit variable for each injector 12*a*, 12*b* is stored in the memory 28 of the ECU 24. For example, if a short circuit is detected at step B9, then the short circuit variable relating to the selected injector 12*a* or 12*b* is incremented. Similarly, if an open circuit is detected at Step B10, then the open circuit variable relating to the selected injector 12*a* or 12*b* is incremented. However, if the selected injector 12*a* or 12*b* is reported non-faulty at Steps B2 or B7, the short and/or open circuit variable is decremented.

If the value of a fault variable reaches a predetermined maximum value, then the system is arranged to disable the faulty injector 12*a* or 12*b*, or disable the entire injector bank 33. The location of the faulty injector 12*a*, 12*b* is stored in the memory 28 of the ECU 24, together with the type of fault, thereby facilitating servicing and location of faulty injectors 12*a*, 12*b*.

FIG. 6 is a plot of the various voltages in the drive circuit 30 of FIG. 2 at a typical engine start-up, showing the point at which the fault detection scheme described above with reference to FIG. 6 is performed. The variation of fuel pressure in a common rail that supplies the injectors 12*a*, 12*b* is also shown in FIG. 6.

Figure 6:
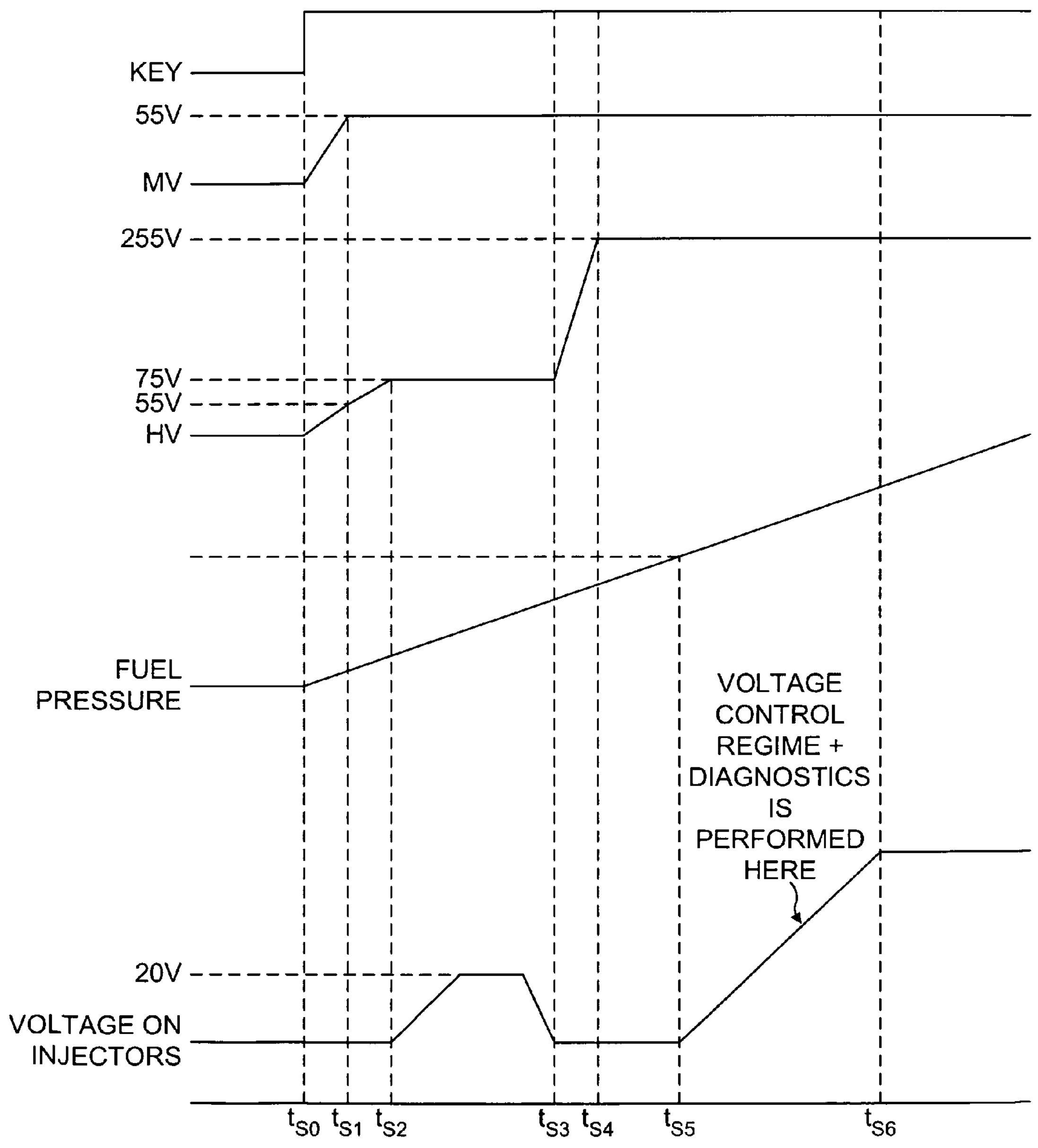
FIG. 6 is a plot of the variation in voltage in the drive circuit of FIG. 2 at a typical engine start-up, showing the point at which the fault detection scheme of FIG. 5 is performed.

Referring to FIG. 6 and also to FIG. 2, at ts0 the engine is keyed-on. The voltage on the mid voltage rail VM increases to 55 Volts between ts0 and ts1. The voltage on the high voltage rail VH also increases to 55 Volts during this period because there is zero Volts on the first storage capacitor C1. A small voltage, approximately 20 Volts, is then generated on the first storage capacitor C1 between ts1 and ts2, thereby raising the voltage on the high voltage rail VH to 75 Volts, and a low voltage diagnostic scheme is performed between ts2 and ts3.

For the avoidance of doubt, the low voltage diagnostic scheme is not the diagnostic scheme described above with reference to FIG. 5, but is instead described in applicant's co-pending patent application EP 07252534.8, the contents of which is incorporated herein by reference as aforesaid. The low voltage diagnostic scheme involves charging the injectors 12*a*, 12*b* to a low voltage, 20 Volts in this example, and testing the injectors 12*a*, 12*b* for faults at this low voltage. It is only possible to perform low voltage diagnostics during this period, because the fuel pressure in the common rail is still low at this time, and charging the injectors 12*a*, 12*b* to a high voltage if the common rail pressure is low may damage the piezoelectric stacks 19 of the injector actuators 16*a*, 16*b*. Whilst the low voltage diagnostics can detect major faults, some faults may not be detected by the low voltage diagnostics because the resolution for detecting faults is low at low voltage. For example, short circuit faults of relatively high resistance may not be detected by the low voltage diagnostics.

Once the low voltage diagnostics are complete, at ts3, all injectors 12*a*, 12*b* end in a discharged state. A high voltage, 200 Volts in this example, is generated on the first storage capacitor C1, such that the voltage on the high voltage rail VH increases to a voltage of 255 Volts between ts3 and ts4. In parallel with these voltages being generated in the injector drive circuit 30, the fuel pressure in the common rail rises. Once the fuel pressure reaches a threshold level, at ts5 in this example, it is safe to charge the injectors 12*a*, 12*b* to a high voltage.

Once the voltage on the high voltage rail has reached 255 Volts, and the common rail pressure has reached the threshold level, the injectors 12*a*, 12*b* are charged to a predetermined target voltage VT between ts5 and ts6. The injectors 12*a*, 12*b* are charged according to the voltage control regime of FIG. 5, and hence it is during this period that the diagnostics of the present invention are performed following key-on at engine start-up.

The example described above with reference to FIG. 6 relates to a so-called 'cold-start'. A cold start is when the time between key-off and key-on is relatively long, such that the voltage on the high voltage rail VH is initially low. If the engine is keyed-off shortly before being keyed-on, a so-called 'fast restart', then the voltage on the high voltage rail VH will still be high, whilst the fuel pressure in the common rail will be low. This is because the fuel pressure drops more quickly than the voltage on the high voltage rail. The diagnostics between ts2 and ts3 in FIG. 6 are not performed during a fast restart because there is a risk that the piezoelectric stacks 19 (FIG. 1) of the injectors 12*a*, 12*b* will be charged to a high voltage in the absence of sufficient fuel pressure in the common rail. However, the diagnostic scheme of the present invention can still be performed during a fast restart because these diagnostics are performed after the common rail pressure has reached its threshold value. The present invention is therefore particularly useful for detecting faults during a fast restart.

Referring again to FIG. 2, in the examples described above, the voltage $V_x$ or $V_{x+1}$ on a selected injector 12*a* or 12*b* is determined by sampling the voltage V3 at the point PS in the resistive bias network 36, and inferring the voltage on the selected injector 12*a* or 12*b* from the value of V3, according to equation 1 above. However, it will be appreciated that in other embodiments of the invention, the voltage on an injector 12*a* or 12*b* may be determined using another technique. For example, the voltage $V_x$ or $V_{x+1}$ at the bias point PB could be sampled and used to infer the voltage $V_x$ or $V_{x+1}$ on a selected injector 12*a* or 12*b*. Alternatively, the voltage on an injector 12*a* or 12*b* may be sampled directly. Further, in other embodiments of the invention, the voltage V3 could be compared to suitable limits to establish the presence of a fault without first calculating the actual voltage $V_x$ or $V_{x+1}$ on an injector 12*a*, 12*b*. This is possible because V3 is directly proportional to the voltage $V_x$ or $V_{x+1}$ on an injector 12*a*, 12*b*, as set out in equation 1 above.

The invention claimed is:

1. A fault detection method for detecting faults in an injector arrangement comprising one or more piezoelectric fuel injectors connected in an injector drive circuit arranged to control operation of the one or more piezoelectric fuel injectors, the fault detection method comprising:

(a) determining a first sample voltage at a sample point in the injector drive circuit at a first sample time, the first sample voltage being related to the voltage on an injector;

(b) calculating, based at least in part on the sample voltage at the first sample time, a range of predicted voltages that are expected at the sample point at a second sample time that is later than the first sample time;

(c) determining a second sample voltage at the sample point at the second sample time; and (d) determining the presence of a fault if the second sample voltage is outside the range of predicted voltages.

2. A fault detection method as claimed in claim 1, wherein the piezoelectric fuel injectors are discharge to inject injectors.

3. A fault detection method as claimed in claim 1, wherein the first sample voltage is the voltage on the injector.

4. A fault detection method as claimed in claim 1, wherein the step of determining the first sample voltage includes sampling a voltage related to the voltage on the injector.

5. A fault detection method as claimed in claim 1, wherein the step of calculating the range of predicted voltages depends upon a capacitance of the piezoelectric fuel injector.

6. A fault detection method as claimed in claim 1, wherein the step of calculating the range of predicted voltages depends upon a function that defines acceptable voltage decay as a function of time.

7. A fault detection method as claimed in claim 1, wherein the step of calculating the range of predicted voltages comprises the steps of determining a minimum predicted voltage and determining the presence of a fault in the event that the second sample voltage is lower than the minimum predicted voltage.

8. A fault detection method as claimed in claim 1, the method further comprising performing a drive pulse on the injector between the first and second sample times and calculating the range of predicted voltages based on the current and the duration of the drive pulse.

9. A fault detection method as claimed in claim 8, further comprising monitoring a current signal in the injector drive circuit during the drive pulse and, if a fault is determined at step (d) in claim 1, inferring the type of fault from the current signal.

10. A fault detection method as claimed in claim 9, further comprising determining the presence of a short circuit if the current signal is indicative of a current flow through the injector.

11. A fault detection method as claimed in claim 9, further comprising determining the presence of an open circuit if the current signal is indicative of substantially no current flow through the injector.

12. A fault detection method as claimed in claim 1, wherein the step of determining the first sample voltage is performed as part of a voltage control regime, the voltage control regime comprising comparing the first sample voltage to a target voltage and, in the event that the sample voltage is not equal to the target voltage, charging or discharging the piezoelectric injector.

13. A fault detection method as claimed in claim 12, further comprising measuring fuel pressure in a common rail supplying the fuel injector and, once the fuel pressure is above a threshold level, performing steps (a) to (d) in claim 1.

14. A fault detection method as claimed in claim 1, wherein the step of determining the second sample voltage is performed as part of the voltage control regime, and wherein the voltage control regime further comprises comparing the second sample voltage to the target voltage and, in the event that the sample voltage is not equal to the target voltage, charging or discharging the injector.

15. A computer program on a computer readable memory or storage device for execution by a computer, the computer program comprising a computer program software portion which, when executed, is operable to implement a fault detection method for detecting faults in an injector arrangement comprising one or more piezoelectric fuel injectors connected in an injector drive circuit arranged to control operation of the one or more piezoelectric fuel injectors, the implemented method comprising:

(a) determining a first sample voltage at a sample point in the injector drive circuit at a first sample time, the first sample voltage being related to the voltage on an injector;

(b) calculating, based at least in part on the sample voltage at the first sample time, a range of predicted voltages that are expected at the sample point at a second sample time that is later than the first sample time;

(c) determining a second sample voltage at the sample point at the second sample time; and (d) determining the presence of a fault if the second sample voltage is outside the range of predicted voltages.

16. A data storage medium having the computer software portion of claim 15 stored thereon.

17. A microcomputer provided with the data storage medium of claim 16.

18. An apparatus for detecting faults in an injector arrangement comprising one or more piezoelectric fuel injectors connected in an injector drive circuit arranged to control operation of the one or more piezoelectric fuel injectors, the apparatus comprising a processor arranged to:

(a) determine a first sample voltage at a sample point in the injector drive circuit at a first sample time, the first sample voltage being related to the voltage on an injector;

(b) calculate, based at least in part on the sample voltage at the first sample time, a range of predicted voltages that are expected at the sample point at a second sample time that is later than the first sample time;

(c) determine a second sample voltage at the sample point at the second sample time; and (d) determine the presence of a fault if the second sample voltage is outside the range of predicted voltages.

19. An apparatus as claimed in claim 18, wherein the processor is arranged to perform the method of claim 1.

* * * * *